(12) United States Patent
Leung

(10) Patent No.: US 8,786,579 B2
(45) Date of Patent: Jul. 22, 2014

(54) HANDWRITING PEN

(76) Inventor: Elton Yu Man Leung, Kowloon (HK)

( * ) Notice: Subject to any disclaimer, the term of this patent is extended or adjusted under 35 U.S.C. 154(b) by 147 days.

(21) Appl. No.: 13/376,378

(22) PCT Filed: Jun. 3, 2010

(86) PCT No.: PCT/CN2010/073487
§ 371 (c)(1),
(2), (4) Date: Dec. 5, 2011

(87) PCT Pub. No.: WO2010/139272
PCT Pub. Date: Dec. 9, 2010

(65) Prior Publication Data
US 2012/0075258 A1    Mar. 29, 2012

(30) Foreign Application Priority Data

Jun. 5, 2009   (CN) .................. 2009 2 0156214 U

(51) Int. Cl.
*G06F 3/033*    (2013.01)
(52) U.S. Cl.
USPC ........................................... 345/179
(58) Field of Classification Search
USPC ........ 345/179; 401/99, 131; 178/19.04, 19.05
See application file for complete search history.

(56) References Cited

U.S. PATENT DOCUMENTS

| | | | |
|---|---|---|---|
| 4,149,812 A * | 4/1979 | Huffman, Jr. .................. 401/6 |
| 4,518,273 A * | 5/1985 | Larizza ........................ 401/98 |
| 5,061,104 A * | 10/1991 | Florjancic ................... 401/195 |
| 6,464,419 B1 * | 10/2002 | Chan ............................ 401/131 |
| RE40,272 E * | 4/2008 | Chan ............................ 401/131 |
| 8,393,069 B2 * | 3/2013 | Glesser et al. ................ 29/527.1 |
| 8,446,393 B2 * | 5/2013 | Liang et al. ................... 345/179 |
| 2003/0066137 A1 * | 4/2003 | Johnson et al. ................... 7/160 |
| 2009/0140456 A1 * | 6/2009 | Glesser et al. ................ 264/242 |
| 2010/0090988 A1 * | 4/2010 | Park ............................ 345/179 |

* cited by examiner

*Primary Examiner* — Abbas Abdulselam

(57) ABSTRACT

A handwriting pen is disclosed. The handwriting pen comprises of a pen barrel 12 and a pen tip 11 which is arranged at one end of the pen barrel 12. A slit 121 is opened on the pen barrel 12. A rotatable rotation element 13 is mounted in the slit 121 through a rotation shaft 14. An enlarged head portion 131, with thickness larger than the width of the slit 121, is on one end of the rotation element 131. When using the handwriting pen, the user rotates the rotation element 13 to make the enlarged head portion 131 of the rotation element rotate 13 into the slit 121 on the pen barrel 12. Since the thickness of the head portion 131 is larger than the width of the slit 121, the slit 121 will be pried open by the head portion 131, and the diameter of the pen barrel 12 is thus increased. The user can hold the pen barrel 12 at the bulged place where the diameter is larger; therefore the handwriting pen can be held and handled more easily. Additionally, the rotation shaft 14 mounted on the pen barrel 12 at the other extremity to the pen tip 11. After the rotation element 13 is rotated, the longer end of the rotation element 13 will extend out a considerable distance from the slit 121 and lengthen the entire length of the handwriting pen. With the length of the handwriting pen is increased, handling and maneuvering of the handwriting pen is made easier.

10 Claims, 3 Drawing Sheets

HANDWRITING PEN

BACKGROUND OF THE INVENTION

1. Field of Invention

The present invention relates to electronic accessories, and more particularly, to a handwriting pen used on computers, PDAs, cellular phones and other digital products.

2. Description of Related Art

With the development of technology, there has been an increasing number of electronic devices, such as computers, PDAs, cellular phones, digital cameras and etc., equipped with handwriting input for character entry.

The handwriting pen is usually designed to be stored in a slot within the electronic device. A handwriting pen comprises of a long rod-shaped pen barrel, a pen tip set at one extremity of the pen barrel, and a pen head set at the other end of the pen barrel. However, with the trend of miniaturization of electronic devices, the handwriting pen is also required to be more compact, making the pen barrel and etc. thinner and smaller. The pen barrel is so small that it makes it uncomfortable to hold, difficult to write with and hard to maneuver. Moreover, the length of the handwriting pen has become shorter too, which makes it uncomfortable for most users to hold and to write with. Therefore, the compact size causes difficulties and inconvenience in using of handwriting pen for writing or drawing.

BRIEF SUMMARY OF THE INVENTION

The principal object of the present invention is to provide a handwriting pen that can increase in both length and diameter of the pen barrel, thus making it easier to handle and maneuver for writing or drawing.

The present invention adopts the following technical solutions to solve the problem: constructing a handwriting pen comprising a pen barrel and a pen tip set at one end of the pen barrel, the pen barrel has a slit, a rotation element is mounted in the slit through a rotation shaft; one end of the rotation element is a enlarged head portion, its thickness is greater than the width of the slit.

In the design of the handwriting pen of the present invention, the slit is opened on the pen barrel, and the rotation shaft is set on one end of the pen barrel that is far away from the pen tip; the distance between the rotation shaft to the end of the rotation element with the head is less than the distance between the rotation shaft to the closed end of the slit.

In the design of the handwriting pen of the present invention, there is a concave convex positioning structure, engaging with each other between the interior of the slit and the exterior of the rotation element.

In the design of the handwriting pen of the present invention, the positioning structure comprises of a convex set on the interior of the slit and the concave set on the exterior of the rotation element; or, the positioning structure comprises of a concave set on the interior of the slit and the convex set on the interior of the rotation element.

In the design of the handwriting pen of the present invention, the pen barrel has a slope at its end, which is far away from the pen tip; the head of the rotation element has a slope matches with the slope on the pen barrel.

In the design of the handwriting pen of the present invention, the closed end of the slit has a slope; rotation element has a slope on its end which is far away from its head, the slope matches with the slope of the closed end of the slit.

In the design of the handwriting pen of the present invention, the closed end of the slit has an arc protrusion; the rotation element has an arc pits on its end which is far away from the head, the arc pits matches the arc protrusion on the closed end of the slit.

In the design of the handwriting pen of the present invention, the pen barrel has arc pits on its end which is far away from the pen tip; the rotation element has an arc protrusion near the root of its the head end, the arc protrusion matches the arc pits on the pen barrel.

In the design of the handwriting pen of the present invention, the slit is a long thin rectangular opening; the rotating element is a long thin rectangular shaft corresponding with the shape of the slit.

In the design of the handwriting pen of the present invention, the pen barrel is plastic or metal.

In the present invention has the following benefits: when using handwriting pen in the present invention, the user rotates the rotation element to make the enlarged head portion rotate into the slit on the pen barrel, since the thickness of the head is greater than the width of the slit, the slit will be pried open by the head portion, and the diameter of the pen barrel is thus increased. The users can hold the pen barrel at the bulged place where the diameter is larger; therefore the handwriting pen can be held and handled more easily.

Additionally, the rotation shaft mounted on the pen barrel at the other extremity to the pen tip. After the rotation element is rotated, the longer end of the rotation element will extend out a considerable distance from the slit and lengthen the entire length of the handwriting pen, handling and maneuvering of the handwriting pen is made easier.

BRIEF DESCRIPTION OF THE SEVERAL VIEWS OF THE DRAWINGS

The following will further illustrate the present invention combined with drawings and embodiments, in the drawings.

DETAILED DESCRIPTION OF THE INVENTION

Figure 1:
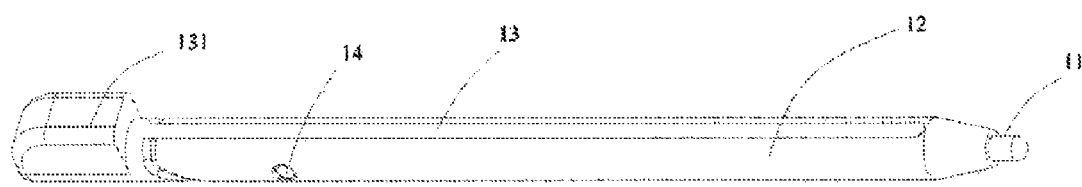
FIG. 1 is a schematic perspective view of that the main body of the rotation element of handwriting pen locates in the slit in the present invention.
Figure 2:
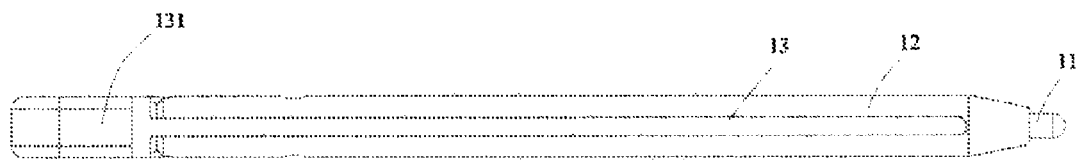
FIG. 2 is a schematic top view of the FIG. 1.
Figure 3:
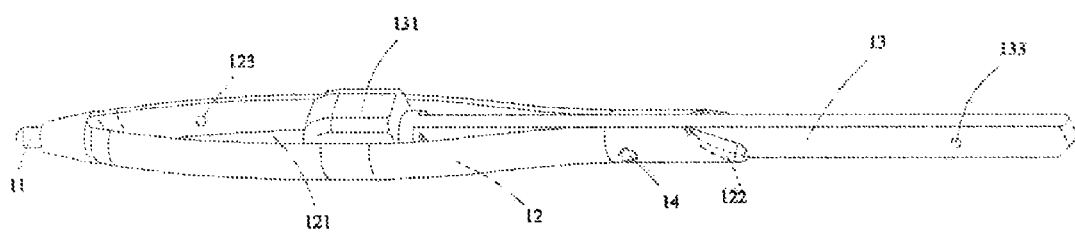
FIG. 3 is a schematic perspective view of that the head of the rotation element of handwriting pen locates in the slit in the present invention.
Figure 4:
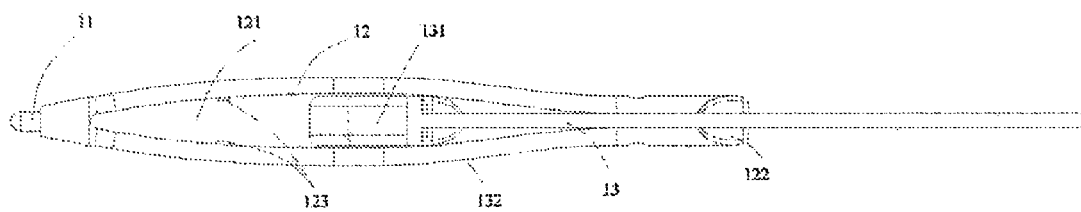
FIG. 4 is a schematic top view of the FIG. 3.
Figure 5:
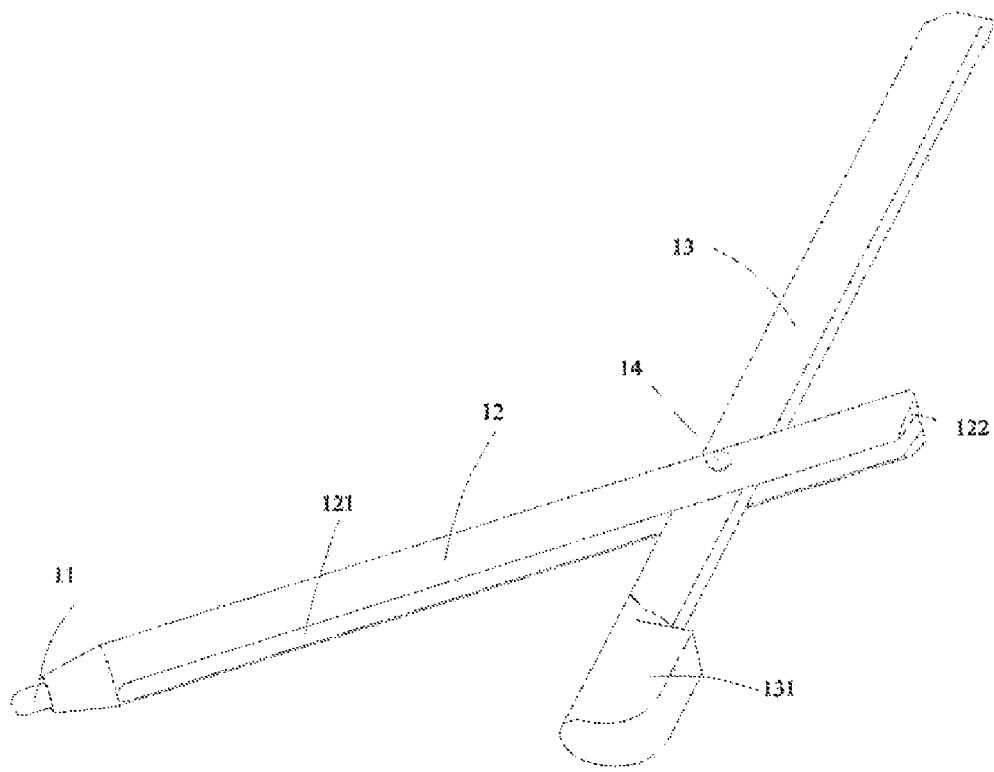
FIG. 5 is a schematic perspective view of that the rotation element of handwriting pen located at an angle by rotating in the present invention.

As shown in FIG. 1 to FIG. 5, a embodiment of the handwriting pen in the present invention comprises a pen barrel 12, a pen tip 11 set at one end of the pen barrel 12 and a rotatable rotation element 13 mounted on the pen barrel 12. The pen tip 11 and pen barrel 12 can be one piece locating at one end of the pen barrel 12; it can also be made using other materials, fastened and installed at one end of the pen barrel 12.

The pen barrel 12 can be a plastic pen barrel 12 or a flexible metal pen barrel 12, which is flexible enough, so that when the head of rotation element 13 is inserted into the pen barrel 12, will cause a distortion in the pen barrel 2. The pen barrel 12 have a slit 121 that is a long thin rectangular shaft extending from one end closed to pen tip 11 to the other end through the entire pen barrel 12.

The rotation element 13 is rotatable and mounted in the slit 121 through rotation shaft 14, the main body of rotation element 13 matches with the shape and size of the slit 121 (in the present embodiment the shape is long thin rectangular shaft; of course, the slit 121 and the main body of rotation element 13 can be designed to be various shapes according to requirements), and one end of the rotation element 13 is designed to be a enlarged head portion 131. The thickness of the enlarged head portion 131 is greater than the width of the slit 121. In order to increase the diameter of the pen barrel to increase the grip surface and distance, the enlarged head portion 131 is inserted in the slit 121 when handwriting pen is in-use.

In the embodiment, the rotation shaft 14 is set on one end of the pen barrel 12 that is far away from the pen tip 11, the distance between the rotation shaft 14 to the end of rotation element 13 with the head 131 is less than the distance between the rotation shaft 14 to the closed end of the slit 121, after the rotation element 13 is rotated to the in-use status, the longer section of the rotation element 13 (namely, the section from the rotation shaft 14 to the closed end of the slit 121) will extend out from the slit 121 and increase the entire length of the handwriting pen, which makes the pen easier to hold and to position for writing or drawing.

Further, in order for the rotation element 13 to remain securely in the slit 121, there is a concave convex positioning structure between the interior of the slit 121 and the exterior of the rotation element 13. The positioning structure comprises of a protrusion 123 set on the interior of the slit 121 and the pit 133 set on the exterior of the rotation element 13. The protrusion 123 and the pit 133 engage with each other in order to make the rotation element 13 remain securely in slit 121. Of course, the positioning structure can also be in other forms, for example, setting the pit on the interior of the slit and setting the protrusion on the exterior of the rotation element.

Further, in order to prevent the rotation element 13 from reverse rotation, the pen barrel 12 has slope 122 on its end which is far away from pen tip 11, at the same time, the head 131 of the rotation element 13 has slope 132 matches the slope 122 of the pen barrel 12. The match between slope 122 and slope 132 makes rotation element 13 rotate restricted in one direction.

Figure 6:
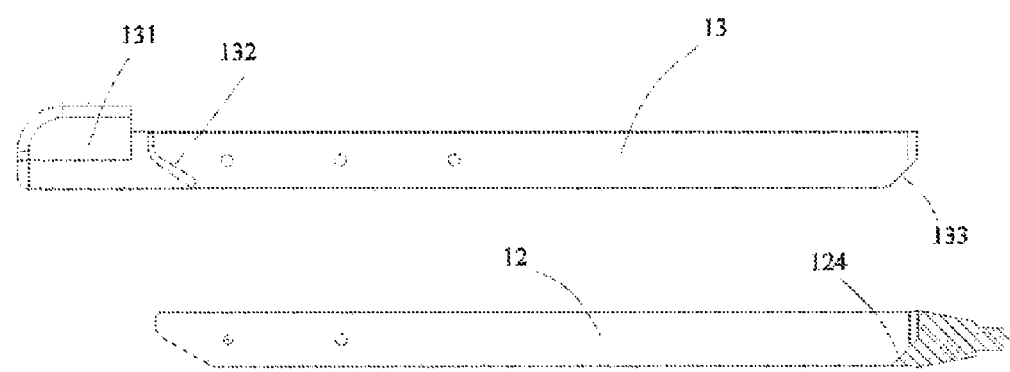
FIG. 6 is a cross-section view of the rotation element and pen barrel of the handwriting pen in the present invention, wherein the pen barrel is divided at the slit.

Further, the closed end of the slit 121 has slope 124, correspondingly, the rotation element 13 has slope 133 at its end which is far away from the head 131 as shown in FIG. 6. The match between slope 123 of the slit 121 and slope 133 of the rotation element 13 can also prevent rotation element 13 from reverse rotation.

When the handwriting pen is not in-use, the long thin body of the rotation element 13 sits in the slit 121, and the pen barrel 12 has relatively small diameter and thus difficult to hold; when in-use, user rolls the rotation element 13 around the rotation shaft 14, so that the head portion 131 of the rotation element 13 enters the slit 121. Because the thickness of the head 131 is greater than the width of the slit 121, the head 131 will expand the slit 121 and increase the diameter of the pen barrel 12, users can then more easily hold or grip the bulged area, which has a greater diameter. In addition, since the rotation shaft 14 is mounted on the pen barrel 12 at the other extremity to the pen tip 11, after the rotation element 13 is rotated, the longer section of the rotation element 13 will extend out to a considerable distance from the slit 121, thus increasing the length of handwriting pen, making its holding, griping and handling easier for the user.

Figure 7:
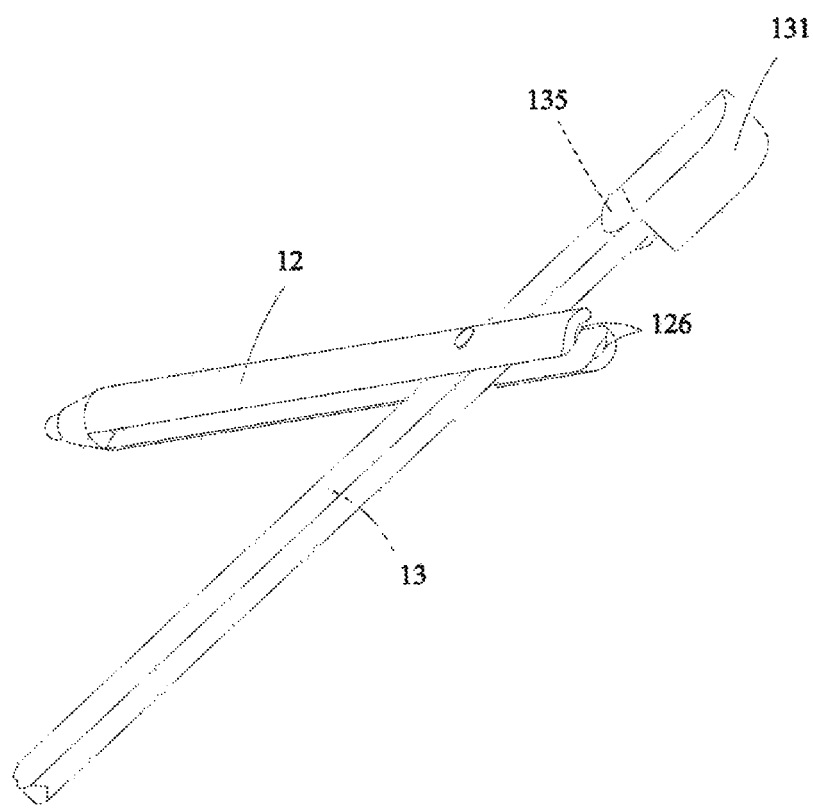
FIG. 7 is a schematic perspective view of the other embodiment of the present invention.
Figure 8:
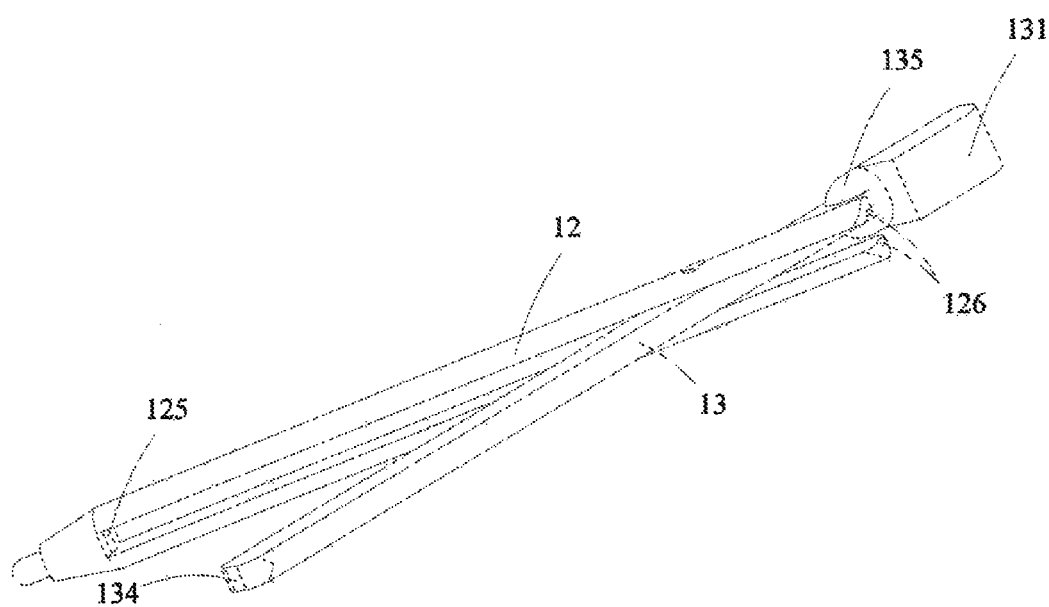
FIG. 8 is a schematic perspective view of the other embodiment of the present invention.

In the other embodiment of the present invention, the slope 124 also can be replaced by other structures, for example, as shown in FIG. 7 and FIG. 8, the closed end of the slit 121 has arc protrusion 125, correspondingly, the rotation element 13 has arc pit 134 on its end that is far away from the head 131; in addition, pen barrel 12 has arc pit 126 on its end that is far away from pen tip 11, correspondingly, the rotation element 13 has arc protrusion 135 near the head 131. The arc protrusion 135 matches with the arc pit 126. The match between arc protrusion 135 and arc pit 126 can also fasten the rotation element 13 at its not in-use position.

The invention claimed is:

1. A handwriting pen comprising:
 a pen barrel having a slit;
 a pen tip set at one end of the pen barrel; and
 a rotation element mounted in the slit through a rotation shaft;
 wherein one end of the rotation element comprises an enlarged head portion having a thickness greater than the width of the slit; and
 wherein the pen barrel is configured such that a diameter of a portion of the pen barrel is increased when the enlarged head portion is inserted into the slit.

2. According to claim 1 of the above-mentioned handwriting pen, the slit is opened on the pen barrel, and the rotation shaft is set on one end of the pen barrel that is far away from the pen tip; the distance between the rotation shaft to the end of the rotation element with the head is less than the distance between the rotation shaft to the closed end of the slit.

3. According to claim 1 of the above-mentioned handwriting pen, there is a concave convex positioning structure, engaging with each other between the interior of the slit and the exterior of the rotation element.

4. According to claim 3 of the above-mentioned handwriting pen, the positioning structure comprises of a convex set on the interior of the slit and the concave set on the exterior of the rotation element; or, the positioning structure comprises of a concave set on the interior of the slit and the convex set on the interior of the, rotation element.

5. According to claim 1 of the above-mentioned handwriting pen, the pen barrel has a slope at its end, which is far away from the pen tip; the head of the rotation element has a slope matches with the slope on the pen barrel.

6. According to claim 1 of the above-mentioned handwriting pen, the closed end of the slit has a slope; the rotation element has a slope on its end which is far away from its head, the slope matches with the slope on the closed end of the slit.

7. According to claim 1 of the above-mentioned handwriting pen, the closed end of the slit has an arc protrusion; the rotation element has an arc pits on its end which is far away from the head, the arc pits matches the arc protrusion on the closed end of the slit.

8. According to claim 1 of the above-mentioned handwriting pen, the pen barrel has an arc pits on its end which is far away from the pen tip; the rotation element has an arc protrusion near the root of its head end, the arc protrusion matches the arc pits on the pen barrel.

9. According to claim 1 of the above-mentioned handwriting pen, the slit is a long thin rectangular opening; the rotating element is a long thin rectangular shaft corresponding with the shape of the slit.

10. According to claim 1 of the above-mentioned handwriting pen, the pen barrel is plastic or metal.

* * * * *